United States Patent
Wen et al.

(10) Patent No.: US 9,374,275 B2
(45) Date of Patent: Jun. 21, 2016

(54) RAPID APPLICATION DEVELOPMENT USING A CONTENT MANAGEMENT SYSTEM

(71) Applicant: Dropbox, Inc., San Francisco, CA (US)

(72) Inventors: Tina Wen, San Francisco, CA (US); Brian Smith, San Francisco, CA (US); Yi Wei, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 160 days.

(21) Appl. No.: 14/103,627

(22) Filed: Dec. 11, 2013

(65) Prior Publication Data

US 2015/0163286 A1   Jun. 11, 2015

(51) Int. Cl.
*G06F 15/16* (2006.01)
*H04L 12/24* (2006.01)
*H04L 29/08* (2006.01)

(52) U.S. Cl.
CPC ........ *H04L 41/0816* (2013.01); *H04L 67/1095* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 5,950,190 | A * | 9/1999 | Yeager | G06F 17/30572 |
| 6,292,187 | B1 * | 9/2001 | Gibbs | H04N 5/44513 |
| | | | | 348/E5.006 |
| 7,519,908 | B2 * | 4/2009 | Quang | G06F 9/5061 |
| | | | | 715/734 |
| 7,685,412 | B1 | 3/2010 | Burdick et al. | |
| 8,135,732 | B2 | 3/2012 | Peng et al. | |
| 8,139,509 | B2 | 3/2012 | Krivopaltsev | |
| 2005/0289536 | A1 * | 12/2005 | Nayak | G06F 8/61 |
| | | | | 717/174 |
| 2006/0036715 | A1 * | 2/2006 | Ghattu | H04L 67/125 |
| | | | | 709/220 |
| 2006/0047798 | A1 * | 3/2006 | Feinleibl | G06F 8/61 |
| | | | | 709/223 |
| 2007/0240154 | A1 * | 10/2007 | Gerzymisch | G06F 8/61 |
| | | | | 717/174 |
| 2008/0040397 | A1 * | 2/2008 | Herbeck et al. | 707/201 |
| 2009/0119325 | A1 * | 5/2009 | Petri | 707/102 |
| 2010/0100590 | A1 | 4/2010 | Palay et al. | |
| 2010/0262632 | A1 * | 10/2010 | Jain | H04L 67/1095 |
| | | | | 707/809 |
| 2010/0306772 | A1 * | 12/2010 | Arnold | G06F 8/36 |
| | | | | 718/1 |
| 2011/0138295 | A1 * | 6/2011 | Momchilov | G06F 9/4445 |
| | | | | 715/740 |
| 2012/0046069 | A1 * | 2/2012 | Cupala | G06F 8/65 |
| | | | | 455/550.1 |
| 2012/0216108 | A1 | 8/2012 | Yambal et al. | |

(Continued)

OTHER PUBLICATIONS

Anzböck, R. et al., "Software Configuration, Dustribution, and Deployment of Web-Services," Proceeding SEKE '02 Proceedings of the 14th International Conference on Software Engineering and Knowledge Engineering, Jul. 15-19, 2002, ACM New York, NY, USA © 2002, pp. 649-656.

*Primary Examiner* — Hung Le
(74) *Attorney, Agent, or Firm* — Fenwick & West LLP

(57) ABSTRACT

An online content management system enables rapid application development by an application developer using an application development system to create a content application configured to execute on a client device. A designated folder on the application development system is designated for sharing with the client device. Configuration data containing parameters for controlling the operation of the content application is stored in the designated folder. The content application on the client device reads the configuration data from the designated location and applies the parameters on execution and thereafter. When the configuration data is modified on the application development system, the modified data is synchronized by the content management system to the client device. The content application on the client device reads the modified configuration data and applies the modified parameters during execution.

27 Claims, 5 Drawing Sheets

(56) References Cited

U.S. PATENT DOCUMENTS

| | | | |
|---|---|---|---|
| 2013/0013931 A1* | 1/2013 | O'Hare | G06F 21/62 713/189 |
| 2013/0014006 A1 | 1/2013 | Abellera et al. | |
| 2013/0144997 A1 | 6/2013 | Kim et al. | |
| 2013/0325925 A1* | 12/2013 | Mizuki | H04L 67/42 709/203 |
| 2013/0332519 A1* | 12/2013 | Walker et al. | 709/203 |
| 2013/0339871 A1* | 12/2013 | Ramini | G06F 9/4443 715/746 |
| 2014/0012797 A1* | 1/2014 | Rao et al. | 706/48 |
| 2014/0068588 A1* | 3/2014 | Tan | G06F 8/65 717/169 |
| 2014/0082003 A1* | 3/2014 | Feldman et al. | 707/755 |
| 2014/0258234 A1* | 9/2014 | Michels et al. | 707/638 |
| 2014/0279846 A1* | 9/2014 | Srinivasan | G06F 17/30011 707/608 |
| 2014/0328332 A1* | 11/2014 | Yang et al. | 370/336 |

* cited by examiner

RAPID APPLICATION DEVELOPMENT USING A CONTENT MANAGEMENT SYSTEM

TECHNICAL FIELD

Disclosed embodiments relate to rapid application development using a content management system to update an configuration data for an application executing on a target client device.

BACKGROUND

One aspect of application development is the design and fine-tuning of the user interface of the application. Conventionally, modifications of the user interface of an application during development are made to the source code of the application in an application development environment, and the code must then be recompiled for a given target client device, reinstalled on the client device, and then executed to determine whether the modifications are acceptable. If not, the developer needs to return to an application development environment, modify the source code again, recompile, reinstall the application on the client, and execute the application. Similar difficulties are encountered when modifying other aspects of an application, such as functional behavior, algorithms, or other operations. Each time a change is made, evaluation of the change requires a recompile, install and execute cycle. This process is extremely time consuming and inefficient for the application developer.

SUMMARY

An online content management system is coupled to an application development system and a client device on which a content application is stored. The application development system and the client device can both be associated with an account on the content management system, which account includes designated storage locations for sharing files between the application development system and the client device. The content management system can be configured to synchronize configuration data that is associated with content application to one of the designated storage locations in the account. The configuration data can include parameters that configure the operation of the content application, including user interface aspects, such as size, shape, location, and color of graphic elements, fonts and font sizes of text elements, as well as parameters for the operation of internal algorithms, computations, and functions. The configuration data can be maintained in a configuration file, or as individual or groups of data items. The content application is configured to read the configuration data from the designated storage location, including the parameters therein, and apply the parameters to control is execution. The application developer may subsequently modify the configuration data, which the content management system then synchronizes to the client device. The content application on the client device reads the modified configuration data from the designated storage location and can update its operation and features accordingly. This eliminates the need for the application developer to recompile and reinstall the application on the client device in order to evaluate the modifications.

The features and advantages described in this summary and the following detailed description are not exhaustive. Many additional features and advantages will be apparent to one of ordinary skill in the art in view of the drawings, specification, and claims hereof.

The figures show various embodiments of the present invention for purposes of illustration only. One skilled in the art will recognize from the following description that alternative embodiments of the structures and methods shown may be used without departing from the principles of this invention.

DETAILED DESCRIPTION

System Overview

Figure 1:
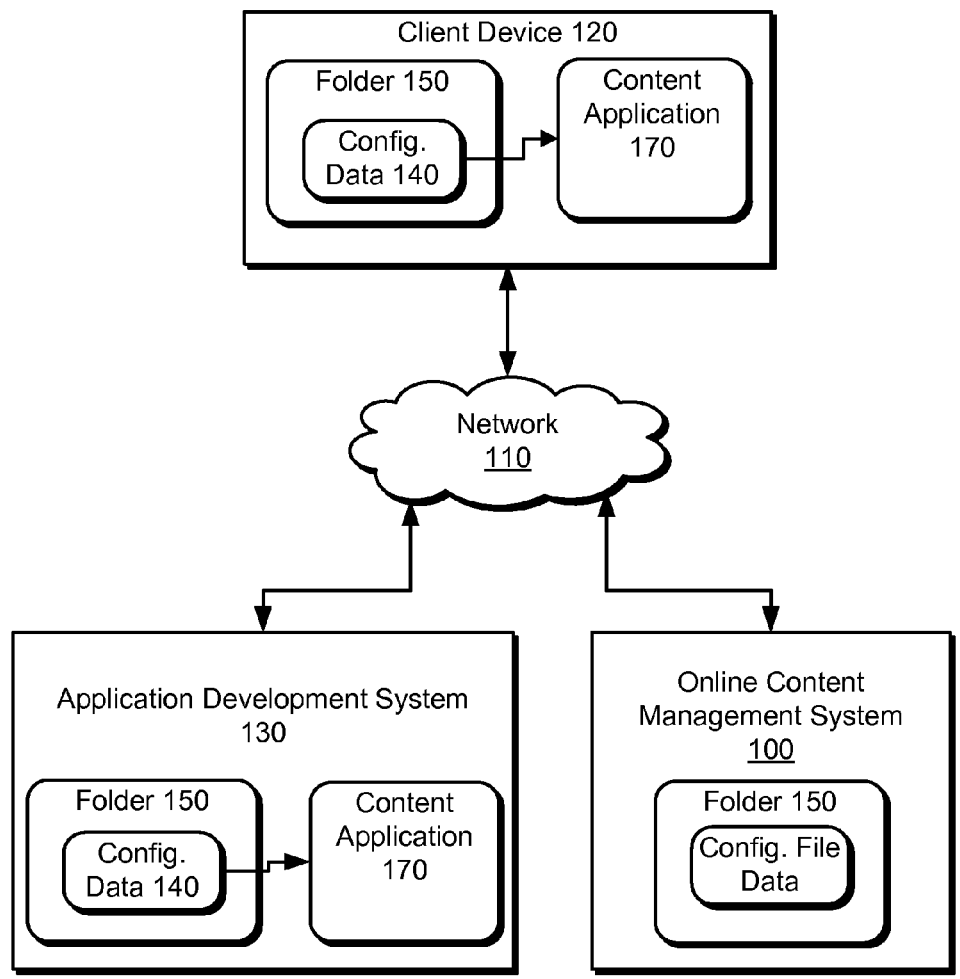
FIG. 1 shows a diagram of a system environment of an online content management system, according to one embodiment.

FIG. 1 shows a system environment including online content management system 100, client device 120, and application development system 130, all communicatively connected by network 110. Client device 120 and application development system 130 are remote from content management system 100 and execute and operate on separate physical apparatuses. Content management system 100 provides content storage, sharing, and synchronization services for users of client devices 120. Generally, these services allow a user to access their content stored in the online content management system 100 from any of their client devices 120 and allow users to share content with other users of client devices 120 through designated shared folders; for the purposes of this disclosure, a folder (identified by a pathname, for example) is an instance of a storage location. In addition to content storage and sharing, online content management system 100 can update shared content responsive to changes and enables users to synchronize changes across multiple client devices 120. A user may synchronize content across multiple client devices 120 owned by the user and associated with the user's account, and the user may share content that can be synchronized with devices associated with other users' accounts. Content stored by online content management system 100 can include any type of data, such as digital data, documents, media (e.g., images, photos, videos, audio, streaming content), data files and databases, source and object code, recordings, and any other type of data or file, hereinafter collectively referred to as "content items." Content stored by online content management system 100 may be organized in folders, tables, collections, or in other database structures (e.g., object oriented, key/value etc.). One type of user of content management system 100 can be an application developer, who can use content management system 100 to share and synchronize application configuration data 140 from application development system 130 to various client devices 120, to rapidly develop and test content applications developed for client devices.

In the environment of FIG. 1, a client device 120 accesses shared content through content management system 100 using a CMS client application 200. As presented to the user, content may be organized according to the display representation employed by client device 120, typically as directories of folders. Thus, each client device 120 may jointly access the shared content, such as a folder 150 containing content items, including application configuration data 140 using the services of CMS client application 200. A client device 120 further executes content application 170, as created by an application developer using application development system 130. Content application 170 can be configured by application developer to read configuration data 140 from a designated folder 150 associated with application 170. Content management system 100 interoperates with CMS client application 200 to synchronize configuration data 140 between application development system 130 and client device 120. Content application 170 reads configuration data 140 and uses the stored information therein, such as application parameters (for the purposes of this disclosure, parameters and "properties" are equivalent), to modify its own operation, including its user interface, internal algorithms, stored data, and the like.

Although only a single client device 120 is shown, there can be any number of client devices 120 in communication with content management system 100 at any time. Various types of devices can function as a client device, such desktop computer, tablet computer, and mobile device. Any device capable of accessing online content management system 100 and interacting with content items stored on content management system 100 may be used as client device 120.

Users may create accounts at content management system 100 and can store content in online content management system 100 by transmitting content from client device 120 to online content management system 100. Users may also store content on online content management system 100 by (for example) requesting transfer of content items from other content providers to online content management system 100. Content stored by users in online content management system 100 is associated with user accounts that may have various privileges. The privileges may include viewing content items, modifying content items, modifying user privileges related to content items, deleting content items, and sharing content items with other users.

Content can also include folders of various types with different behaviors, or other content item grouping methods. For example, an account can include a public folder that is accessible to any user. The public folder can be assigned a web-accessible address. A link to the web-accessible address can be used to access contents of the public folder. In another example, an account can include a photos folder intended for photos and that provides specific attributes and actions tailored for photos; an audio folder that provides the ability to play back audio files and perform other audio related actions; or other special purpose folders. In another example, an account can include a downloads folder that can be the default folder in which content items from third-party content servers are stored. In another example, an account of an application developer can include a folder 150 (or directory) designated for a particular content application 170, such as a main bundle or resource folder into which all of the code and other resources for an application, including configuration data 140, are stored. An account can also include shared folders or group folders that are linked with and available to multiple user accounts. The permissions for multiple users may be different for a shared folder.

An application development system 130 can be communicatively coupled to content management system 100 through the network 110, and includes CMS client application 200. Application development system 130 can be used by an application developer to code content applications 170 for execution by a client device 120. Application development system 130 can comprise one or more computers configured to execute an application development environment. Application development environment can be for any operating system, such as Xcode™ from Apple Computer for application development on iOS™ and MacOS, Android Developer Tools for Android™ from Google, Inc., Microsoft Visual Studio for application development for Windows™ from Microsoft Corp., for example. An application development system 130 includes a source code editor, compiler, debugger, user interface builder, code analyzer, as well as other automation, analysis, and design tools. An application development system 130 can be provided on various types of computers, including desktop computer, tablet computer, and mobile device. Application development system 130 can be also a client of content management system 100.

In the context of the present disclosure, where client device 120 is a mobile device, such as a smartphone or tablet devices, content application 170 can be specifically designed to execute on that type of device, rather than on a general desktop or notebook computer on which application development system 130 is implemented. This is similar, for example, to how applications for embedded systems are developed, where the development environment can be both physically separate and computationally distinct (i.e., in terms of OS platform) from client device 120. In conventional practice for this type of development, the application developer must develop on a development system, such as application development system 130 and then install and test on a target system, which makes rapid application development (development using numerous iterative builds to progressively design and build applications) difficult. Accordingly, to speed up the development of content application 170, the application developer maintains one or more folders 150 on content management system 100 for use in developing content applications 170 for client devices 120. Content applications 170 are further described below. As mentioned above, the application developer typically maintains folder 150 on application development system 130 in which the source code files and resources for a given application are stored in various folders. The application developer may designate this folder 150 for storing configuration data 140 specific to application 170. Designated folder 150 (and configuration data 140 therein) can be made available to content management system 100 by CMS client application 200 as shared folder for synchronizing with client device 120 that includes application 170. For example, in an embodiment for application development for iOS and OS X applications, configuration data 140 can be part of an application's bundle directory, which contains code and related resources, such as images and audio files; the application developer would designate the bundle directory as the folder 150 for sharing and synchronization by content management system 100. Alternatively, the application developer may designate a separate folder 150, one that can be separate from and outside the main folder used for the code and resources of content application 170, in which to store configuration data 140.

Configuration data 140 can include any type of parameters, properties, or variables useful for defining the user interface (e.g., colors/texture of graphical objects, text, font style, font colors, etc.) and functional operation (e.g., parameters or variables for use in algorithms, functions, methods) of content application 170. For example, parameters for user interface properties can include text that defines the names of windows, buttons, icons, as well as the fonts, colors and styles of such text. Parameters for functional operations can include, for example, variables used in image display (e.g., parameters used rendering images or movies), variables used in audio decoding (e.g., selection of audio codec, rate and quality parameters), variable used in game play (e.g., motion control parameters, character or game play setup). Parameters may also include functional code itself (e.g., code implementing a class method, algorithm, or the like). Configuration data 140 may be implemented as functional code that programmatically generates configuration parameters.

In one embodiment, the configuration data 140 is stored in a configuration file. The particular format for configuration file may vary depending on the specific platform and operating system for which content application 170 is developed. Configuration files may be stored as an XML property list file (file extension.plist), as an Windows Registry files (file extension .REG); as an XML resource file in Android, or as equivalent file types. Application parameters are stored in a suitable storage format, such as a text string, decimal string, data string, encoded binary data, array, or tag dictionary, resource lists, and as well as using forth using name/value pairs. For example, for iOS applications, each application has a XML property list file, typically named Info.plist file that can serve as a configuration file, though any other property list file may be used as well, for example a Data.plist file is often stored in a Resources folder and contains application specific data values. A parameter in a property list file may be defined by a pair of XML elements including a <key> tag defining a name for the parameter, and data type tag (e.g., <integer>, <array>, <string>, <data>, etc.) containing the value of the parameter. Alternatively, a configuration file may be stored as a program code file that executes one or more functions that generate the application parameters, which can be then serialized into an XML or other file format.

A sample configuration file containing configuration data for a content application 170 that is simple arcade game, may be follows:

```
<?xml version="1.0" encoding="UTF-8"?>
<!DOCTYPE plist PUBLIC "-//Apple//DTD PLIST 1.0//EN"
"http://www.apple.com/DTDs/PropertyList-1.0.dtd">
<plist version="1.0">
  <dict>
    <key>Default</key>
    <dict>
      <key>targetDensity</key>
      <integer>1</integer>
      <key>targetFrequency</key>
      <integer>10</integer>
      <key>targetRadius</key>
      <integer>6</integer>
      <key>targetSpeed</key>
      <integer>12.5</integer>
      <key>weaponSpeed</key>
      <integer>6</integer>
      <key>showEasterEgg</key>
      <integer>1</integer>
    </dict>
  </dict>
</plist>
```

In the example configuration file shown here, the configuration data 140 comprises keys such as targetDensity, targetFrequency, targetRadius, targetSpeed which define the values for how the parameters by which a target in the arcade game appears and moves on screen; likewise the key weaponSpeed defines the value for how quickly a weapon in the game moves. The content application would include program code for algorithmic functions that control the number of targets displayed on a display device using the targetDensity and targetFrequency values, the speed at which the targets move using the targetSpeed value, and the size of the targets using the targetRadius value, and the speed at which a weapon moves using the weaponSpeed value. These are examples of configuration data 140 defining values for algorithmic functions. The key showEasterEgg is an example of configuration data 140 that defines a logic value for whether to enable the display of hidden feature of the game. Thus, the code for the content application 170 would be configured with corresponding variables using the named keys in its program code, which would then be set to the values defined by the items of configuration data.

In one embodiment using configuration files, the configuration data are maintained in several files including a default configuration file and a custom configuration file. The default configuration file stores default values for the configuration data, while the custom configuration data stores values specifically customized by the application developer during application development and testing. Content application 170 is configured in this embodiment to read the default configuration file from a default directory, and the custom configuration file from the designated storage location that can be shared with client device 120 via content management system 100.

In one embodiment, application development system 130 includes property editor 160 that can be used by the application developer to examine and modify application properties set forth in configuration data 140. In one embodiment, the property editor 160 reads configuration data 140 and creates a web page that exposes the various properties in an editable format, such as form and input fields. This enables the application developer to very quickly edit configuration data 140 using the editor 160.

Client devices 120 communicate with online content management system 100 through network 110. Network 110 may be any suitable communications network for data transmission. In one embodiment, network 110 includes portions over the Internet and uses standard communications technologies and/or protocols. Thus, network 110 can include both wired (e.g., Ethernet) and wireless (e.g., 802.11, 802.16) physical layers, as well various transport (e.g., TCP, UDP), network (e.g., IP), session (e.g., TLS, SSL), and application layer (e.g., HTTP) protocols. No particular implementation of the network 110 is required by the disclosed embodiments, other than the ability of application development system 130, client device 120 and content management system 100 to communicate with each thereby.

In another embodiment, online content management system 100 and client devices 120 use custom and/or dedicated data communications technologies instead of, or in addition to, the ones described above.

Figure 2:
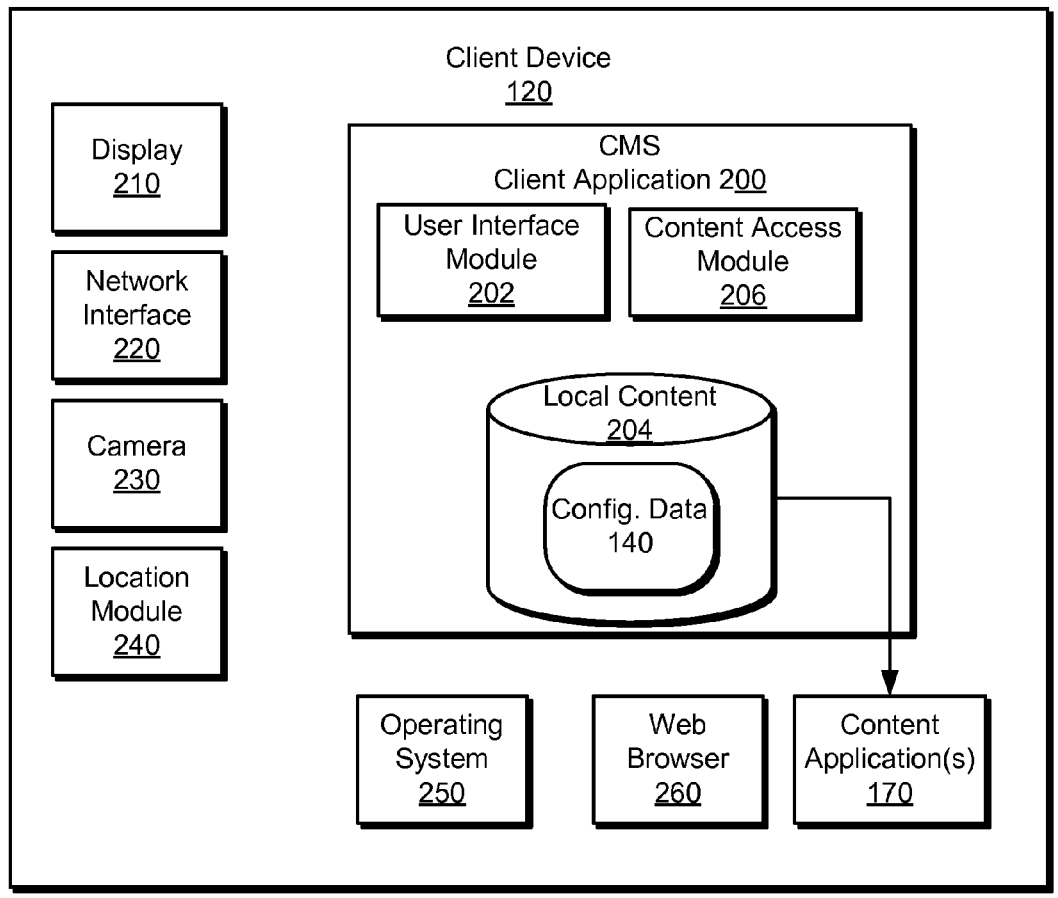
FIG. 2 shows one embodiment of components of a client device.

FIG. 2 shows one embodiment of components of client device 120. Client device 120 generally includes devices and modules for communicating with content management system 100 and a user of client device 120. Client device 120 includes display 210 for providing information to the user, and in certain client devices 120, display 210 can be a touchscreen. Client device 120 also includes network interface 220 for communicating with content management system 100 via network 110. Other conventional components of client device 120 that are not material are not shown, for example, one or more computer processors, local fixed memory (RAM and ROM), as well as optionally removable memory (e.g., SD-card), power sources, and audio-video outputs.

A client device 120 includes various components and modules for operating client device and accessing online content management system 100. The software modules include operating system 250 and one or more content applications 170. Content applications 170 vary based on client device, and may include various applications for creating, viewing, consuming, and/or modifying content stored on online content management system 100, such as word processors, spreadsheets, database management systems, code editors, image and video editors, e-book readers, audio and video players, and the like. Operating system 250 provides a local file management system and executes the various software modules such as content management system (CMS) client application 200 and content applications 170.

Client device 120 access online content management system 100 in a variety of ways. CMS client application 200 can be a dedicated application or module that provides access the services of content management system 100, providing both user access to shared files through a user interface, as well as programmatic access for other applications, such as content application 170. Client device 120 may also access online content management system 100 through web browser 260. As an alternative, CMS client application 200 may integrate access to online content management system 100 with the local file management system provided by operating system 250. When access to online content management system 100 is integrated in the local file management system, a file organization scheme maintained at online content management system 100 can be represented as a local file structure by operating system 250 in conjunction with client application 200. CMS client application 200 may take various forms, such as a stand-alone application, an application plug-in, or a browser extension. CMS client application 200 includes user interface module 202, local content 204, and content access module 206. An instance of a CMS client application 200 can be also present on application development system 130, as shown in FIG. 1.

User interface module 202 of CMS client application 200 generates an interface to content accessed by CMS client application 200 and is one means for performing this function. The generated interface is provided to the user by display 210. The user interface represents the user's folders and files using, for example, a hierarchical outline browser interface, a multiple columnar browser interface, or other suitable graphical representations of folders and directories.

Local content 204 may store content accessed from online content management system 100 by CMS client application 200. While represented here as within CMS client application 200, local content 204 may be stored with other data for client device 120 in non-volatile storage. When local content 204 is stored this way, the content can be available to the user and other applications or modules, such as content applications 170, even when CMS client application 200 is not in communication with online content management system 100. Local content 204 includes configuration data 140 that is associated with one or more content applications 170, as determined an application developer.

Content access module 206 of CMS client application 200 manages updates to local content 204 and communicates with online content management system 100 to synchronize content modified by client device 120 with content maintained on online content management system 100, and is one means for performing this function. Content access module 206 can be configured to access one or more folders 150 designated by the application developer for obtaining access to configuration data 140 stored therein.

In certain embodiments, client device 120 includes additional components such as camera 230 and location module 240. Camera 230 may be used to capture images or video for upload to the online content management system 100. Location module 240 determines the location of client device 120, using for example a global positioning satellite signal, cellular tower triangulation, or other methods. Location module 240 may be used by CMS client application 200 to obtain location data and add the location data to metadata about a content item, such as an image captured by camera 230.

Figure 3:
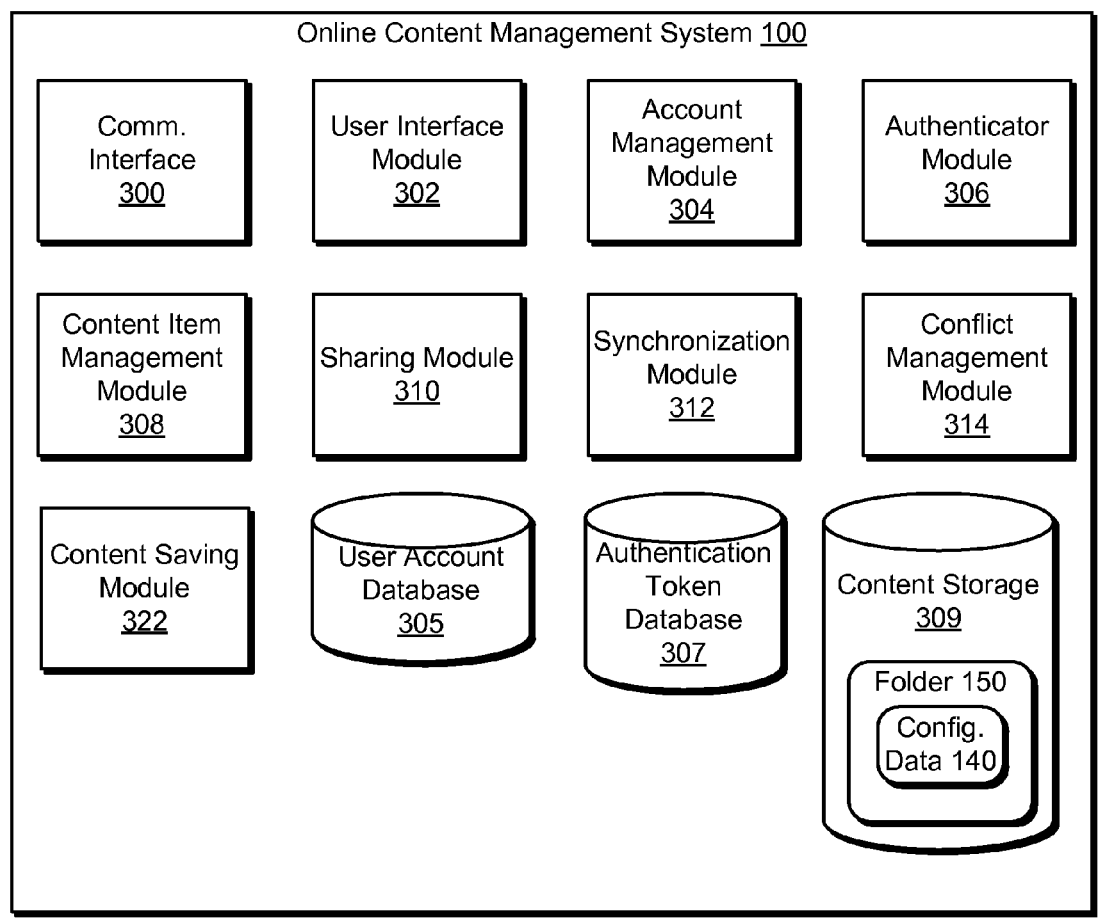
FIG. 3 shows components of an online content management system, according to one embodiment.

FIG. 3 shows components of online content management system 100 according to one embodiment. Online content management system 100 includes communication interface 300, user interface module 302, account management module 304, user account database 305, authenticator module 306, authentication token database 307, content item management module 308, content storage 309, sharing module 310, synchronization module 312, conflict management module 314, and content saving module 322.

Communications interface 300 enables online content management system 100 to interface with various client devices 120, and with other content and/or service providers via an Application Programming Interface (API), which is one means for performing this function. Certain software applications access content stored by the online content management system 100 via an API on behalf of a user. For example, a content application 170 can programmatically make calls directly to online content management system 100, when a user provides credentials, to read, write, create, delete, share, or otherwise manipulate content. Similarly, the API can allow users to access all or part of content stored by online content management system 100 through a web site.

User interface module 302 generates a web interface that allows a user to view or manipulate content, and is one means for performing this function. For example, the user can navigate in web browser 260 to a web address provided by online content management system 100. Changes or updates to content stored by online content management system 100 made through the web interface, such as uploading a new version of a file, are synchronized back to other client devices 120 associated with the user's account. Multiple client devices 120 may be associated with a single account and files in the account are synchronized between each of the multiple client devices 120.

Account management module 304 can be configured to update and/or obtain user account details stored in user account database 305, and is one means for performing this function. Account management module 504 can be configured to interact with any number of other modules in online content management system 100.

User account database 305 maintains details of the user accounts, and is one means for performing this function. An account can be used to store content, such as documents, text files, audio files, video files, etc., from one or more client devices associated with the account. For use in conjunction with application development system 130, content management system 100 stores application configuration data 140 in association with an application developer's user account, in directories and folders as designated by the application developer. In addition, the user account database stores information identifying the particular devices associated with a user's account. Accordingly, the user account for the application developer identifies application development system 130 and client device 120 as being associated with the application developer's account.

User account database 305 can store profile information for registered users. In some cases, the only personal information in the user profile can be a username and/or email address. However, online content management system 100 can also be configured to accept additional user information, such as password recovery information, demographics information, payment information, and other details. Each user can be associated with an identifier, such as a userID or a user name. User account database 305 can also include account management information, such as account type, e.g. free or paid;

usage information for each user, e.g., file edit history and file access history from each client device 120 used by the user; maximum storage space authorized; storage space used; content storage locations; security settings; personal configuration settings; content sharing data; etc.

Authenticator module 306 verifies user credentials, security tokens, API calls, specific client devices, etc., to determine whether access to requested content items is authorized, and is one means for performing these functions. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 307. Upon receiving a request to validate an authentication token, authenticator module 306 checks authentication token database 307 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate, delete, or mark as used the matching authentication token in the authentication token database 307 to prevent future re-use of a single-use token.

Content item management module 308 maintains a content directory that identifies the location of each content item in content storage 309, and allows client applications 200 to request access to content items in content storage 309, and is one means for performing these functions. A content entry in the content directory can also include a content pointer that identifies the location of the content item in content storage 309. For example, the content entry can include a content pointer designating the storage address of the content item in memory. In some embodiments, the content entry includes multiple content pointers that point to multiple locations, each of which contains a portion of the content item.

Content storage 309 stores content items and is one means for performing this function. Content storage 309 can be a storage device, multiple storage devices, or a server. Alternatively, content storage 309 can be a cloud storage provider or network storage accessible via one or more communications networks. In one configuration, online content management system 100 stores the content items in the same organizational structure as they appear on client device 120. However, online content management system 100 can store the content items in its own order, arrangement, or hierarchy.

Content storage 309 stores the contents of the designated folder 150 and configuration 140 as selected by the application developer. Content storage 309 can also store metadata describing content items, content item types, and the relationship of content items to various accounts, folders, or groups. The metadata for a content item can be stored as part of the content item or can be stored separately. In one configuration, each content item stored in content storage 309 can be assigned a system-wide unique identifier. Content storage 309 can decrease the amount of storage space required by identifying duplicate files or duplicate segments of files. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 309 stores files using a file version control mechanism that tracks changes to files, different versions of files (such as a diverging version tree), and a change history. The change history includes a set of changes that, when applied to the original file version, produces the changed file version.

Sharing module 310 manages sharing content publicly or privately, and is one means for performing this function. Sharing content publicly can include making the content item accessible from any computing device in network communication with online content management system 100. Sharing content privately can include linking a content item in content storage 309 with two or more user accounts so that each user account has access to the content item. The content can also be shared across varying types of user accounts. In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts. To share a content item privately, sharing module 310 adds a user account identifier to the content entry associated with the content item, thus granting the added user account access to the content item. Sharing module 310 can also be configured to remove user account identifiers from a content entry to restrict a user account's access to the content item. To share content publicly, sharing module 310 generates a custom network address, such as a URL, which allows any web browser to access the content in online content management system 100 without any authentication. The sharing module 310 includes content identification data in the generated URL, which can later be used by online content management system 100 to properly identify and return the requested content item. For example, sharing module 310 can be configured to include the user account identifier and the content path in the generated URL. The content identification data included in the URL can be transmitted to online content management system 100 by client device 120 to access the content item. In addition to generating the URL, sharing module 310 can also be configured to record that a URL to the content item has been created. In some embodiments, the content entry associated with a content item can include a URL flag indicating whether a URL to the content item has been created. The sharing module 310 is responsible for sharing the designated folder 150 and configuration data 140 with a client device 120 of the application developer.

Synchronization module 312 automatically synchronizes content from one or more client devices, and is one means for performing this function. The synchronization can be platform-agnostic. That is, the content can be synchronized across multiple client devices 120 of varying type, capabilities, operating systems, etc. For example, CMS client application 200 synchronizes, via synchronization module 512 at online content management system 100, content in client device 120's content management system with the content in an associated user account on system 100. CMS client application 200 synchronizes any changes to specified content (e.g., content located in a designated folder or its sub-folders) with the synchronization module 312. Such changes include new, deleted, modified, copied, or moved files or folders. Synchronization module 312 also provides any changes to content associated with client device 120 to CMS client application 200. This synchronizes the local content at client device 120 with the content items at online content management system 100. The synchronization module 312 synchronizes updates to configuration data 140 made by an application developer on application development system 130 to those client devices 120 with which configuration data 140 is shared.

Conflict management module 314 determines whether there are any discrepancies between versions of a content item located at different client devices 120, and is one means for performing this function. For example, when a content item is modified at one client device and a client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying client device 120 of the later-submitted version.

Content saving module 322 makes content items of third party providers available to a user via the user's account on online content management system 100, and is one means for performing this function. In one embodiment, content saving module 322 receives a request that specifies the user of online content management system 100 for whom the content item should be saved, the content item to be saved, and the content provider that provides the content. Content saving module 322 determines whether the content item has already been stored within content storage 309, and if not, obtains the content item from the third party content provider (if it has not already been obtained) and stores it within content storage 309.

Online content management system 100 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 Gb to 2 Tb of computer readable, persistent storage, and running an operating system such as LINUX or variants thereof. The operations of online content management system 100 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, notes servers, failover servers, network management tools and so forth are not shown so as not to obscure the features of the system. Finally, the functions and operations of online content management system 100 are sufficiently complex as to require implementation on a computer system, and cannot be performed in the human mind simply by mental steps.

Rapid Application Development Using an Online Content Management System

Figure 4A:
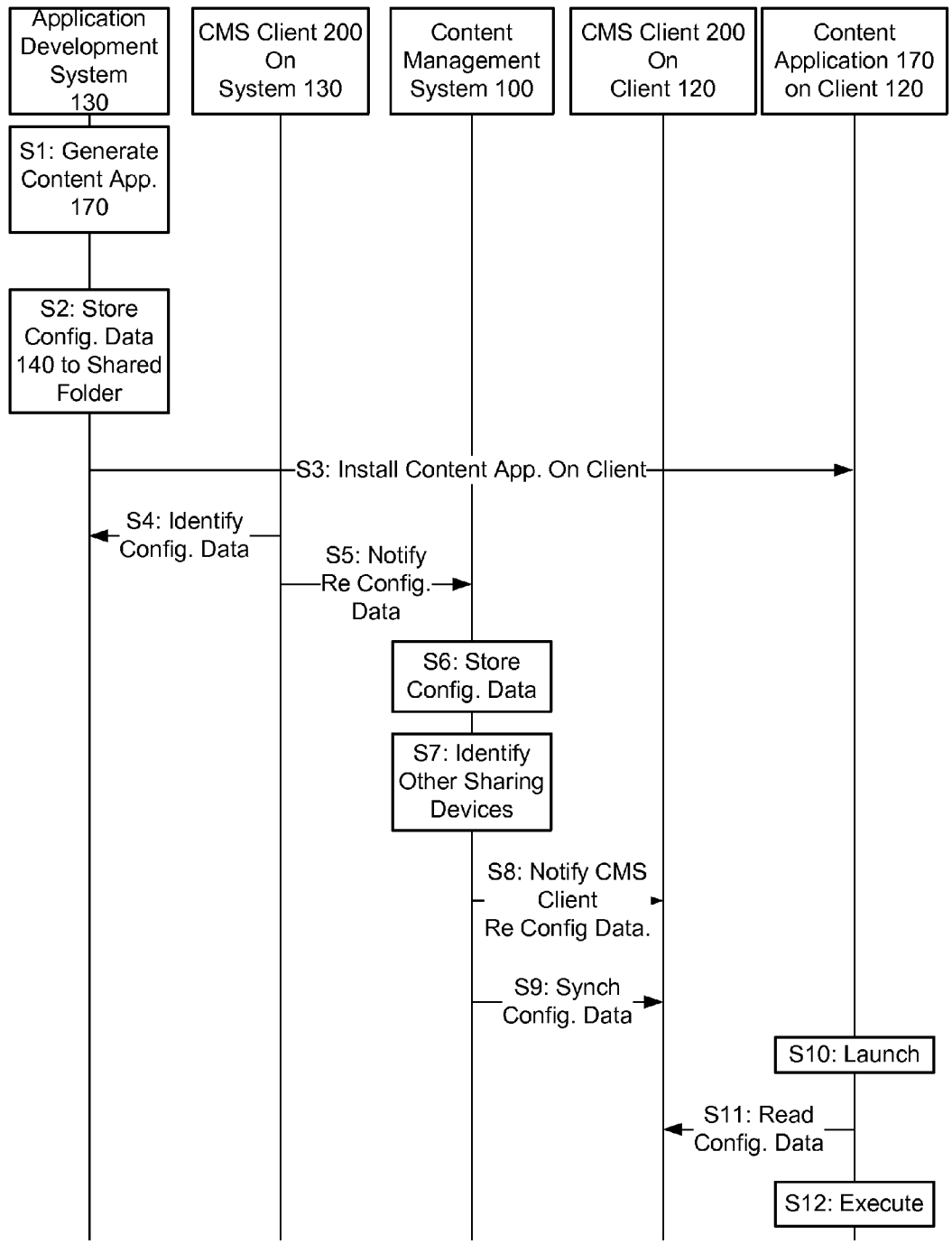
FIGS. 4(a) and 4(b) together show a sequence diagram of the operation of the online content management system in coordination with an application development system and client device.
Figure 4B:
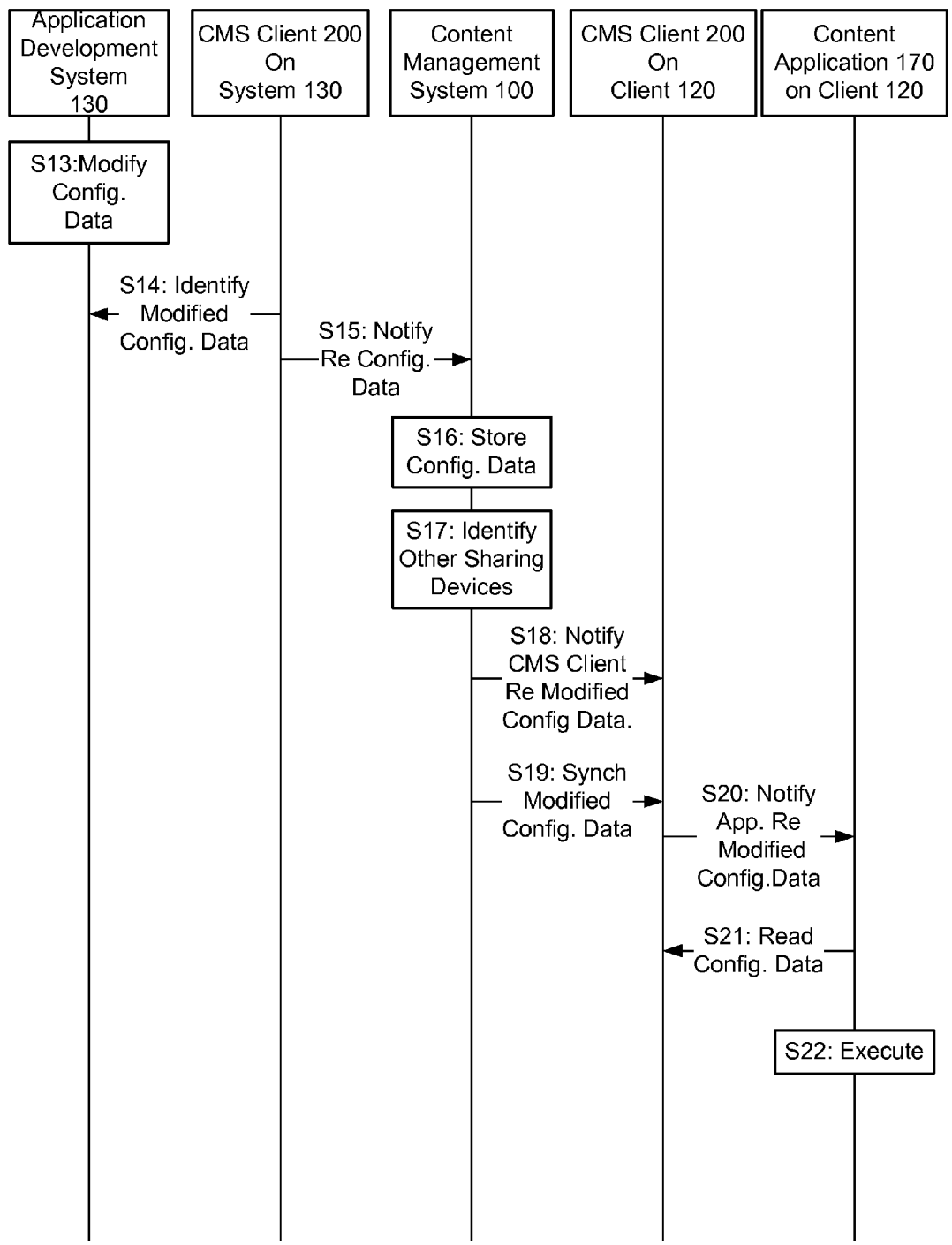

An application developer can use the online content management system 100 to rapidly develop and fine tune the design and operation of content applications 170 for client devices 120. FIGS. 4(*a*) and 4(*b*) show a sequence diagram illustrating an example of the operations of content management system 100 in conjunction with application development system 130 and content application 170 on client device 120.

Referring to FIG. 4(*a*), using application development system 130, the application developer generates (S1) the code files for content application 170 for client device 120, including configuration data 140. This includes the steps of source code development, static and dynamic analysis, debugging, compilation, build automation, and so forth.

The application developer stores (S2) configuration data 140 to a local folder 150 or directory on application development system 130 that the developer has designated as being shared via content management system 100. For example, where content application 170 is an iOS application, the application developer can designate the main bundle directory for application as the folder 150 being shared with content management system 100. Alternatively, the application developer can designate a folder 150 that is separate from the main application folder for content application 170. The application developer then installs (S3) client application 120 on client device 120.

CMS client application 200 identifies (S4) that there is new configuration data 140 to be shared in the designated directory, and notifies (S5) content management system 100. Content management system 100 receives configuration data 140 from CMS client application 200 and stores (S6) it in the account associated with the application developer. Content management system 100 determines (S7) from the application developer's account the other devices, such as client device 120, with which to share configuration data 140. Content management system 100 notifies (S8) CMS client application 200 on client device 120 that there is an shared file available for synchronization (i.e., configuration data 140, though CMS client application 200 is generally agnostic as to the nature of the file being synched). Content management system 100 then synchronizes (S9) configuration data 140 to CMS client application 200 on client device 120, to the folder 150 therein designated by the application developer for storing configuration data 140. Thus client device 120 has a copy of configuration data 140.

On client device 120, content application 170 is launched (S10). Application 170 reads (S11) configuration data 140 from the designated storage location at which it is stored by local CMS client application 200. Upon reading configuration data 140, content application 170 applies the various application parameters specified therein and begins execution (S12). As described above, the application parameters can define the appearance as well as functional operation of the content application. Content application 170 can read configuration data 140 during execution to obtain further operational parameters.

Referring now to FIG. 4(*b*), the application developer at some point later modifies (S13) configuration data 140 on application development system 130 to provide updated or new parameters, thereby creating a modified version of configuration data 140. CMS client application 200 identifies (S14) the modified configuration data 140 in the local storage of application development system 130. CMS client application 200 notifies (S15) content management system 100 that configuration data 140 has been modified, and stores (S16) the modified version of configuration data 140 to content management system 100.

Content management system 100 identifies (S17) client device 120 one of the devices with which the modified configuration data is shared, and notifies (S18) CMS client application 200 on client device 120 that configuration data 140 has been modified. Content management system 100 then synchronizes (S19) the modified configuration data 140 to CMS client application 200 on client device 120. CMS client application 200 notifies (S20) content application 170 that configuration data 140 has been modified. Content application 170 reads (S21) the modified configuration data 140 and executes (S22) using the updated or new parameters, thereby adjusting, changing, or otherwise altering the appearance and/or functional operation of application 170 based on the modified parameters.

In one embodiment of the foregoing, content management system 100 and CMS client application 200 are agnostic as to the contents of configuration data 140 being individual properties and parameters, treating the information therein as undifferentiated data. Accordingly, when configuration data 140 is modified, content application 170 reads the all of updated configuration data 140. For example, where the configuration data 140 is maintained in a configuration file, the entire configuration file would be synchronized between the application development system 130 and the client device 120, and read by the content application 170. In another embodiment, content management system 100 and CMS client applications 200 are configured to read and parse configuration data 140 into individual parameters (e.g., name/value pairs), and operate upon the parameters as individual elements, rather than simply as part of an entire file. This enables content management system 100 to store and retrieve the parameters individually, allowing CMS client applications 200 to likewise access the parameters individually as needed by content application 170. Accordingly, when individuals ones of the parameters are modified (S13) by the application developer, CMS client application 200 on application development system 130 identifies (S14) the modified parameters among the configuration data 140, and stores (S16) those to content management system 100. Content management system 100 in turn notifies (S18) CMS client application 200 on client device 120 of which individual parameters of configuration data 140 have been modified, and synchronizes (S19) those modified parameters to configuration data 140 on the client device 120, without rewriting the unmodified parameters or portions of configuration data. CMS client application 200 then notifies (S20) content application 170 of the particular modified parameters, and content application 170 reads (S21) just the modified parameters from configuration data 140 as necessary, and executes (S22) accordingly, adjusting its operation based on the modified parameters. A further detailed discussion of the mechanisms and processes for handling individual data items by content management system 100 is provided in U.S. application Ser. No. 14/040,584 filed on Sep. 27, 2013, which is incorporated by reference herein, in its entirety.

Additional Configuration Considerations

The present invention has been described in particular detail with respect to several possible embodiments. Those of skill in the art will appreciate that the invention may be practiced in other embodiments. Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description. In addition, the present invention is not restricted to any particular programming language. It will be appreciated that a variety of programming languages may be used to implement the teachings of the present invention, and any references to specific languages are provided for enablement purposes or to describe the best mode.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:

receiving and storing, at an online content management system, application configuration data for a content application on a first client device, the content application configured to execute on a second client device using the application configuration data, the application configuration data including a plurality of application parameters for modifying at least one of a user interface of the content application or parameters of an algorithm of the content application;

synchronizing, by the online content management system, the application configuration data to the second client device through the online management system, the content application being configured to read the application configuration data on the second-client device and apply the application parameters to modify at least one of a user interface of the content application or parameters of the algorithm of the content application on the second client device;

receiving, from the first client device, a modified version of the application configuration data modified by the first client device, the modified version of the application configuration data including at least one modified application parameter;

storing, at the online management system, the modified version of the application configuration data; and synchronizing, by the online content management system, the modified application configuration data to the second client device through the online content management system to provide the modified application configuration data to the second client device, the content application on the second client device being configured to read the modified application configuration data and apply the at least one modified application parameter, the modified application parameter modifying at least one of the user interface of the content application or the parameters of the algorithm of the content application on the client device.

2. The method of claim 1, wherein the application configuration data is stored in a configuration file, the configuration file including a plurality of XML elements defining pairs of parameter names and parameter values.

3. The method of claim 1, wherein storing at an online content management system application configuration data for a content application on a second client device, further comprises:

receiving the application configuration data at the content management system from an application development system, wherein the application development system stores the application configuration data in a folder designated for sharing with the second client device.

4. The method of claim 3, wherein synchronizing, with the online content management system the application configuration data to the second client device further comprises:

storing the application configuration data to a folder on the second client device designated for receiving the application configuration data, wherein the content application is configured to read the application configuration data from the designated folder on the second client device.

5. The method of claim 3, wherein the folder designated for sharing with the second client device is a main application directory storing code and resources for the content application.

6. The method of claim 3, wherein the folder designated for sharing with the second client device is a folder on the application development system that is separate from and outside of the main application directory storing code and resources for the content application.

7. The method of claim 1, wherein synchronizing, with the online content management system, the modified application configuration data to the second client device to produce a modified application configuration data, further comprises:

synchronizing, with the online content management system, the at least one modified parameter application configuration data to the second client device, without rewriting non-modified parameters of the application configuration data, wherein the client application on the second client device is configured to read the at least one modified parameters from the configuration data, and apply the at least one modified application parameter.

8. The method of claim 1, wherein synchronizing, with the online content management system the application configuration data to the second client device further comprises:

receiving a notification from an application development system to share the application configuration data stored at the content management system with a second client device, wherein the second client device is located remotely from the content management system.

9. The method of claim 1, wherein receiving and storing on the online content management system a modified version of the application configuration data, further comprises:

receiving notification from an application development system that the configuration data has been modified; and storing the modified configuration data at the content management system.

10. A non-transitory computer-readable storage medium having executable a computer program embodied therein for controlling a computer processor to perform steps comprising:

receiving and storing, at an online content management system, application configuration data for a content application on a first client device, the content application configured to execute on a second client device using the application configuration data, the application configuration data including a plurality of application parameters for modifying at least one of a user interface of the content application or parameters of an algorithm of the content application;

synchronizing, by the online content management system, the application configuration data to the second client device through the online management system, the content application being configured to read the application configuration data on the second-client device and apply the application parameters to modify at least one of a user interface of the content application or parameters of the algorithm of the content application on the second client device;

receiving, from the first client device, a modified version of the application configuration data modified by the first client device, the modified version of the application configuration data including at least one modified application parameter;

storing, at the online management system, the modified version of the application configuration data; and synchronizing, by the online content management system, the modified application configuration data to the second client device through the online content management system to provide the modified application configuration data to the second client device, the content application on the second client device being configured to read the modified application configuration data and apply the at least one modified application parameter, the modified application parameter modifying at least one of the user interface of the content application or the parameters of the algorithm of the content application on the client device.

11. The computer-readable storage medium of claim 10, wherein the application configuration data is stored in a configuration file, the configuration file including a plurality of XML elements defining pairs of parameter names and parameter values.

12. The computer-readable storage medium of claim 10, wherein the step of storing at an online content management system application configuration data for a content application in development for execution on a second client device, further comprises:

receiving the application configuration data at the content management system from an application development system, wherein the application development system stores the application configuration data in a folder designated for sharing with the second client device.

13. The computer-readable storage medium of claim 12, wherein the step of synchronizing, with the online content management system the application configuration data to the second client device further comprises:
    storing the application configuration data to a folder on the second client device designated for receiving the application configuration data, wherein the content application is configured to read the application configuration data from the designated folder on the second client device.

14. The computer-readable storage medium of claim 12, wherein the folder designated for sharing with the second client device is a main application directory storing code and resources for the content application.

15. The computer-readable storage medium of claim 12, wherein the folder designated for sharing with the second client device is a folder on the application development system that is separate from and outside of main application directory storing code and resources for the content application.

16. The computer-readable storage medium of claim 10, wherein the step of synchronizing, with the online content management system, the modified application configuration data to the second client device to produce a modified application configuration data, further comprises:
    synchronizing, with the online content management system, the at least one modified parameter application configuration data to the second client device, without rewriting non-modified parameters of the application configuration data, wherein the client application on the second client device is configured to read the at least one modified parameters from the configuration data, and apply the at least one modified application parameter.

17. The computer-readable storage medium of claim 10, wherein the step of synchronizing, with the online content management system the application configuration data to the second client device further comprises:
    receiving a notification from an application development system to share the application configuration data stored at the content management system with a second client device, wherein the second client device is located remotely from the content management system.

18. The computer-readable storage medium of claim 10, wherein the steps of receiving and storing on the online content management system a modified version of the application configuration data, further comprises:
    receiving notification from an application development system that the configuration data has been modified; and
    storing the modified configuration data at the content management system.

19. A computer system, comprising:
    a computer processor; and
    a computer-readable medium storing a computer program executable by the computer processor, the computer program embodied therein for controlling the computer processor to perform steps comprising:
    receiving and storing, at an online content management system, application configuration data for a content application on a first client device, the content application configured to execute on a second client device using the application configuration data, the application configuration data including a plurality of application parameters for modifying at least one of a user interface of the content application or parameters of an algorithm of the content application;
    synchronizing, by the online content management system, the application configuration data to the second client device through the online management system, the content application being configured to read the application configuration data on the second-client device and apply the application parameters to modify at least one of a user interface of the content application or parameters of the algorithm of the content application on the second client device;
    receiving, from the first client device, a modified version of the application configuration data modified by the first client device, the modified version of the application configuration data including at least one modified application parameter;
    storing, at the online management system, the modified version of the application configuration data; and
    synchronizing, by the online content management system, the modified application configuration data to the second client device through the online content management system to provide the modified application configuration data to the second client device, the content application on the second client device being configured to read the modified application configuration data and apply the at least one modified application parameter, the modified application parameter modifying at least one of the user interface of the content application or the parameters of the algorithm of the content application on the client device.

20. The computer system of claim 19, wherein the application configuration data is stored in a configuration file, the configuration file including a plurality of XML elements defining pairs of parameter names and parameter values.

21. The computer system of claim 19, wherein the step of storing at an online content management system application configuration data for a content application in development for execution on a second client device, further comprises:
    receiving the application configuration data at the content management system from an application development system, wherein the application development system stores the application configuration data in a folder designated for sharing with the second client device.

22. The computer system of claim 21, wherein the step of synchronizing, with the online content management system the application configuration data to the second client device further comprises:
    storing the application configuration data to a folder on the second client device designated for receiving the application configuration data, wherein the content application is configured to read the application configuration data from the designated folder on the second client device.

23. The computer system of claim 21, wherein the folder designated for sharing with the second client device is a main application directory storing code and resources for the content application.

24. The computer system of claim 21, wherein the folder designated for sharing with the second client device is a folder on the application development system that is separate from and outside of main application directory storing code and resources for the content application.

25. The computer system of claim 19, wherein the step of synchronizing, with the online content management system, the modified application configuration data to the second client device to produce a modified application configuration data, further comprises:
    synchronizing, with the online content management system, the at least one modified parameter application configuration data to the second client device, without rewriting non-modified parameters of the application configuration data, wherein the client application on the second client device is configured to read the at least one modified parameters from the configuration data upon execution, and apply the at least one modified application parameter.

26. The computer system of claim 19, wherein the step of synchronizing, with the online content management system the application configuration data to the second client device further comprises:

receiving a notification from an application development system to share the application configuration data stored at the content management system with a second client device, wherein the second client device is located remotely from the content management system.

27. The computer system of claim 19, wherein the steps of receiving and storing on the online content management system a modified version of the application configuration data, further comprises:

receiving notification from the application development system that the configuration data has been modified; and storing the modified configuration data at the content management system.

* * * * *